United States Patent [19]

Smith et al.

[11] Patent Number: 5,542,635
[45] Date of Patent: Aug. 6, 1996

[54] FILE CONTAINER ASSEMBLY INCLUDING BRACKETS FOR WALL OR CART MOUNTING

[75] Inventors: Keith Smith, Memphis, Tenn.; Kenneth M. Smith, Olive Branch, Miss.; Scott D. Smith, Memphis, Tenn.

[73] Assignee: Leeco Industries, Inc., Olive Branch, Miss.

[21] Appl. No.: 313,939

[22] Filed: Sep. 28, 1994

[51] Int. Cl.⁶ .................................................. A47B 96/06
[52] U.S. Cl. ................. 248/221.12; 248/129; 280/47.35
[58] Field of Search .............................. 248/222.4, 129, 248/311.2; 280/47.35; 220/481; 211/55, 88, 51

[56] References Cited

U.S. PATENT DOCUMENTS

| | | |
|---|---|---|
| 174,377 | 3/1876 | Munson . |
| D. 183,425 | 8/1958 | Grow ..................................... 280/47.35 |
| 1,044,492 | 11/1912 | Clark et al. ................................. 211/88 |
| 1,738,821 | 12/1929 | Gibson ........................................ 211/55 |
| 1,898,835 | 2/1933 | Henderson ............................ 248/311.2 |
| 2,105,594 | 1/1938 | Henrich ..................................... 211/88 |
| 2,310,390 | 2/1943 | Bridges et al. .......................... 220/481 |
| 2,673,671 | 3/1954 | Williams ............................... 280/47.35 |
| 2,807,371 | 9/1957 | Johnson ..................................... 211/88 |
| 3,159,368 | 12/1964 | Ahlbin et al. .......................... 248/222.4 |
| 3,182,809 | 5/1965 | Getoor ....................................... 211/88 |
| 3,341,026 | 9/1967 | Spitler ....................................... 211/88 |
| 3,908,831 | 9/1975 | Brendgord ............................... 211/88 |
| 4,162,014 | 7/1979 | Bobrick ..................................... 211/50 |
| 4,363,496 | 12/1982 | Schreiner ............................. 280/47.35 |
| 4,588,094 | 5/1986 | Evans ......................................... 211/55 |
| 4,955,488 | 9/1990 | Nicoll ......................................... 211/88 |
| 5,016,760 | 5/1991 | Mayo ......................................... 211/55 |
| 5,094,349 | 3/1992 | DeVito ....................................... 211/50 |

*Primary Examiner*—Karen J. Chotkowski
*Assistant Examiner*—Anita M. King
*Attorney, Agent, or Firm*—Lowe, Price, Leblanc & Becker

[57] ABSTRACT

A mounting bracket assembly and file container assembly include a pair of mounting brackets and a file container which can be easily mounted to a vertical surface such a wall or a file shuttle or cart. The mounting brackets include supporting posts for supporting a file container and through holes for mounting the brackets to a vertical surface. Alternatively, the mounting brackets can be attached to a file shuttle using elongated slots along an edge of the bracket. The slots and posts are located on the brackets to provide a uniform footprint when surface mounting or access to the slots when file shuttle mounting.

12 Claims, 2 Drawing Sheets

FILE CONTAINER ASSEMBLY INCLUDING BRACKETS FOR WALL OR CART MOUNTING

FIELD OF THE INVENTION

The present invention is directed to a file container assembly including brackets for mounting a file container to a wall or cart and, in particular, to a pair of brackets which may be interchangeably used for wall or cart mounting.

BACKGROUND ART

In the prior art, the use of file trays or containers in different mounting arrangements is well known. U.S. Pat. No. 4,588,094 to Evans discloses a file tray adapted to be mounted on a generally vertical wall with headed fasteners driven into the wall. The file trays are adapted to serve both as a primary and secondary file tray in a vertical array including a primary file tray and at least one secondary file tray.

U.S. Pat. No. 4,162,014 to Bobrick discloses a composite letter file consisting of a primary tray member defining a letter receptacle and having detent means thereupon for engagement by corresponding detent means on a secondary tray member. The primary tray has supporting means associated therewith adapted to maintain it in operative relationship with a supporting surface.

U.S. Pat. No. 4,955,488 to Nicoll disclose a cluster bin assembly which includes a generally planar member which may be folded into a bin-shaped configuration and mounted upon a wall. The member includes hook-like portions which cooperate with wall brackets to retain the folded bin therein.

U.S. Pat. No. 1,044,492 to Clark et al. discloses an attachment for sewing machines adapted to serve as a receptacle or holder for the sewing as it passes through the machine. The receptacle is provided with clamps for removably attaching the same to the rear or off-side of the machine.

The use of shuttles or carts for storing files is also known. Typically, these carts comprise a pair of U-shaped legs interconnected by cross members and a utility self and supported by rollers for cart movement. Holders for files such as box or file holders can then be secured to data rods extending between the two U-shaped legs.

One of the drawbacks of these types of shuttles or carts is insufficient file container space. Another drawback of the prior art discussed above is the inability of the various types of file containers to be used in different mounting arrangements.

In view of the deficiencies in the prior art discussed above, a need has developed to provide a file container assembly which is adaptable for different uses. In response to this need, the present invention provides a file container assembly which permits mounting of file containers to a cart or surface using a pair of mounting brackets.

SUMMARY OF THE INVENTION

Accordingly, it is a first object of the present invention to provide an improved file container assembly which is adaptable for use in shuttles or in a surface-mounted configuration.

Another object of the present invention is to provide a pair of mounting brackets which can be used for surface or shuttle mounting depending on their orientation.

It is a still further object of the present invention to provide a mounting bracket assembly which includes means for supporting a file container as well as means for attachment to a surface or shuttle.

Other objects and advantages of the present invention will become apparent as a description thereof proceeds.

In satisfaction of the foregoing objects and advantages, the present invention provides a mounting bracket assembly for mounting file containers to a wall or cart comprising at least a pair of brackets. Each bracket further comprises a plate, means for mounting a plate to a surface, a pair of posts mounted to one surface of the plate in a spaced apart relationship and a pair of slots located along one edge of the plate and also in spaced apart relationship. The posts of each bracket can support a file container with the bracket attached to a surface. Alternatively, the slots on each bracket can engage the ribs of a cart so that the file container can be easily mounted to the cart.

The posts and slots on each plate are located such that the slots of each bracket oppose each other for surface mounting and are opposite each other for cart mounting. When surface mounting, the brackets are sized such that the edges without the slots align with the sides of a file container to provide a uniform footprint against the mounting surface.

For cart mounting, inversion of the brackets exposes a portion of the brackets for engagement with the cart ribs while still positioning the posts to receive corresponding openings in the file container for cart mounting.

BRIEF DESCRIPTION OF THE DRAWINGS

Reference is now made to the drawings of the invention wherein.

DESCRIPTION OF THE PREFERRED EMBODIMENTS

The present invention discloses a mounting bracket assembly for use with a file container for either surface mounting such as a wall or shuttle mounting. The mounting brackets of the file container assembly are particularly configured so they can be interchangeably used for either surface mounting or shuttle mounting. When surface mounted, the mounting brackets are configured to align with the sides of the file container to give a uniform footprint. Alternatively, the mounting brackets are used in an opposing fashion to facilitate mounting to a shuttle. In this mounting arrangement, the file container maintains the mounting brackets in a locked position on the shuttle by the engagement between the file container and mounting bracket support posts.

Figure 1:
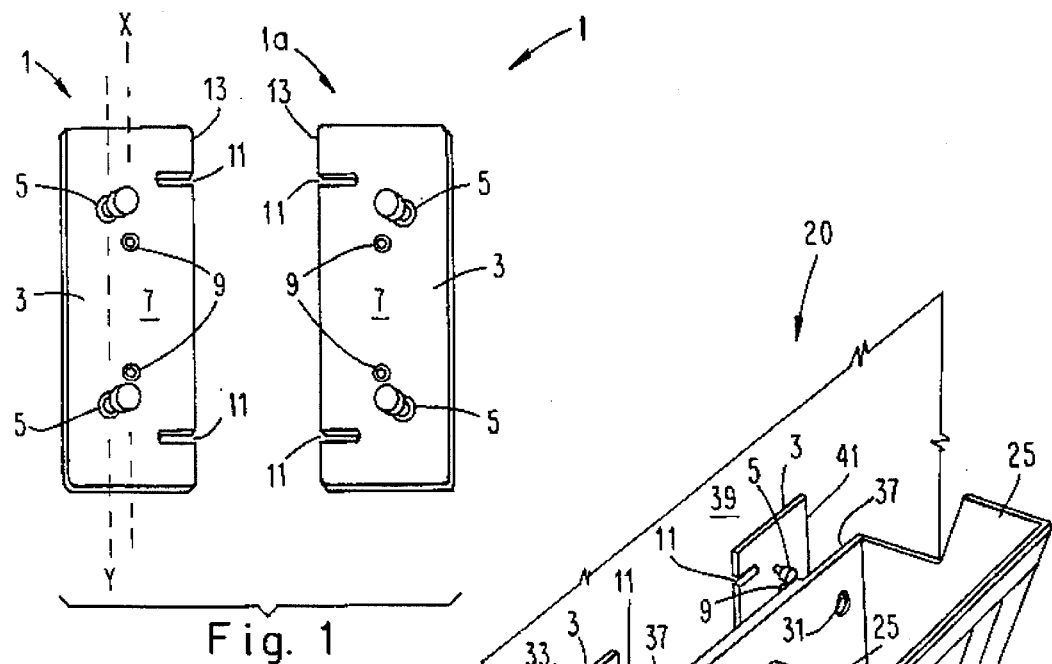
FIG. 1 is a front perspective view of the mounting bracket assembly of the present invention.

With reference to FIG. 1, the mounting bracket assembly is generally designated by the reference numeral 10 and is seen to include a pair of brackets 1. Each bracket comprises a plate 3 having a pair of support posts 5 extending outwardly from a plate surface 7.

Each plate 3 also includes a pair of through holes 9 and slots 11, the slots extending from the plate edge 13.

As can be seen from FIG. 1, the through holes 9 are aligned with the longitudinal axis X of the plate 3. The posts 5 are located on the line designated by the reference letter Y, the Y line spaced apart and parallel to the longitudinal axis X. As will be described hereinafter, the arrangement of the posts 5 and slots 11 facilitate interchangeable mounting between a surface and a shuttle.

Figure 2:
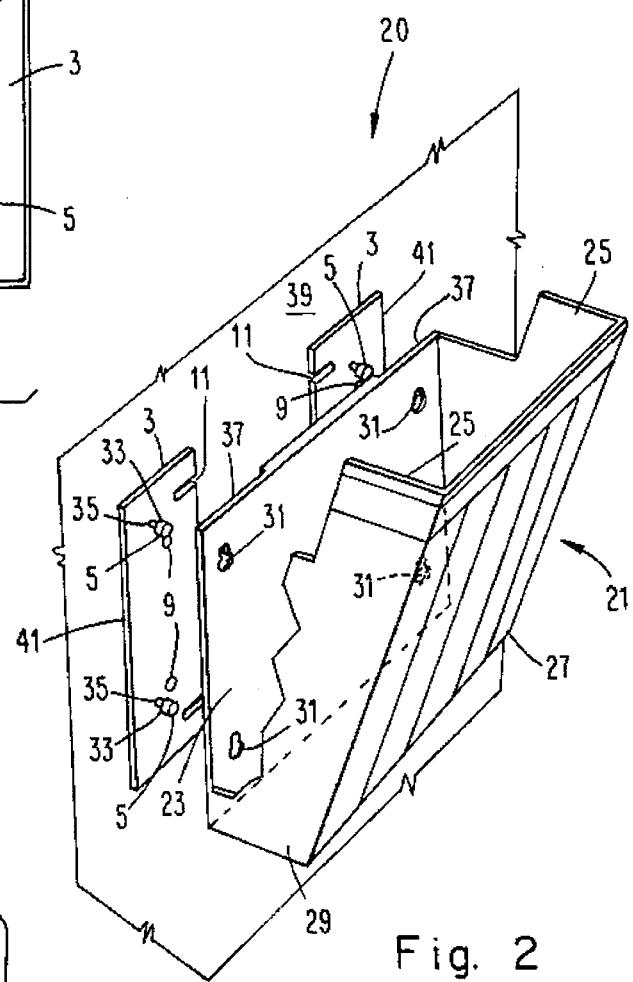
FIG. 2 shows a perspective view of the inventive file container assembly in an exemplary wall mounting, the components shown apart and with portions broke away to show greater detain.

FIG. 2 shows a file container assembly generally designated by the reference numeral 20 in an exemplary wall mounting configuration. The file container 21 comprises a back 23, opposing sides 25, a front 27 and a bottom 29. The back 23 of the file container has key holes 31 therethrough and in a spaced-apart relationship. The larger opening portion of the key hole 31 is sized to receive the larger diameter portion 33 of the posts 5 with the smaller opening portion of the key hole 31 designed to engage the reduced diameter portion 35 of the posts 5.

The back 23 also includes a pair of recesses 37 which are sized to receive the plates 3 when the file container assembly is mounted to the wall surface 39.

When mounting the file container assembly 20, the plates 3 are fastened to the wall surface 39 using fasteners (not shown) extending through the through holes 9 in each plate 3. The plates 3 are mounted on the wall surface in a spaced apart relationship so that the distance between the posts 5 of each plate coincides with the distance between the corresponding key holes 31.

After the plates 3 are mounted, the file container 21 is mounted to the plates 3 by passage of the posts 5 into the key hole slots 31, the reduced diameter portion 35 of the posts 5 engaging the smaller portion of the key hole opening 31 to securely fasten the file container to the wall surface 39. When mounted, the plates 3 engage the recesses 37 in the back 23 of the file container 1 such that the edges 41 of each of the plates 3 align with the sides 25 of the file-container 21. This alignment provides a uniform footprint on the wall surface 39 for the entire file container assembly 20.

Figure 3:
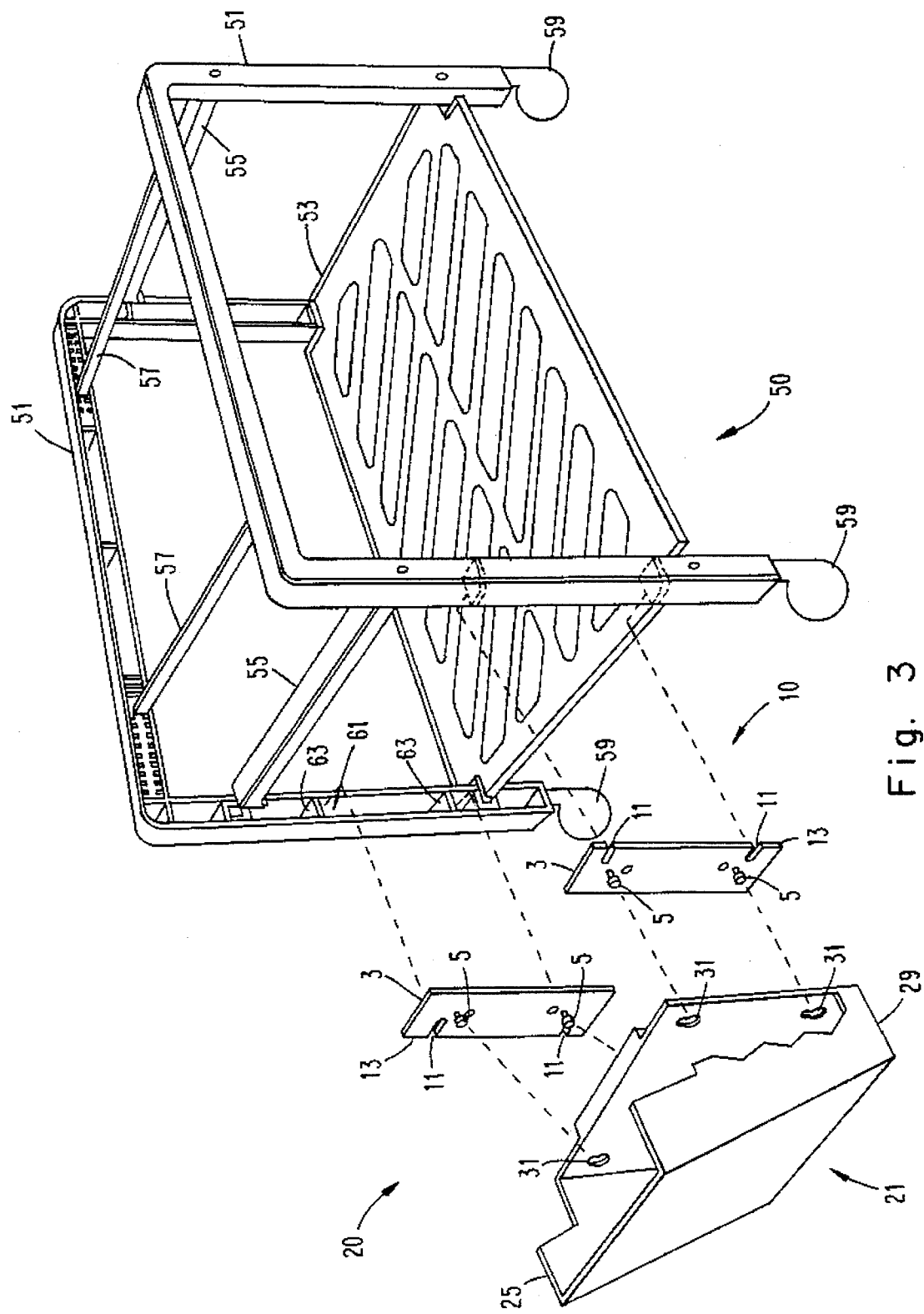
FIG. 3 shows the inventive file container assembly for use with a shuttle.

FIG. 3 depicts the file container assembly 20 in an exemplary and exploded use with a shuttle 50. The shuttle 50 has a pair of U-shaped legs 51, the U-shaped legs 51 separated by the utility shelf 53 and cross members 55. Data rods 57 are disposed between the U-shaped members 51 to support file pockets (not shown) or other storing devices.

The shuttle 50 also has rollers 59, each attached to the terminal end of each of the legs 51 for shuttle movement.

Each of the U-shaped legs 51 are also U-shaped in cross section so as to form a channel 61 therein. Disposed within the channel 61 are ribs 63 which may be attached in any conventional fashion such as gluing, engaging slots in the leg portions 51 or the like. The ribs 63 are sized to engage the slots 11 in the plates 3.

When mounting the file containers assembly 20 to the shuttle 50, the plates 3 are first mounted to the U-shaped legs 51 by engagement between the slots 11 and ribs 63.

The file container 21 is then mounted to the plates 3 via engagement between the posts 5 and key holes 31 as described above. The post/key hole engagement maintains the plates 3 in a spaced-apart relationship such that the slots cannot disengage the ribs 63. In this manner, the file container 21 is securely mounted to the shuttle 50 without the need for any fasteners or the like.

As can be seen from FIG. 3, the plates 3 are orientated such that the edges 13 are facing away from each other. With this configuration and the location of the supporting posts 5, the plates 3 extend beyond the side walls of the file container 21 so that the slots 11 can engage the ribs 63 fully and without interference from the file container 21.

Although FIG. 3 depicts a single file container 21 and mounting bracket assembly 10, additional ribs can be mounted to the U-shaped legs for mounting more than one file container 21.

Figure 4:
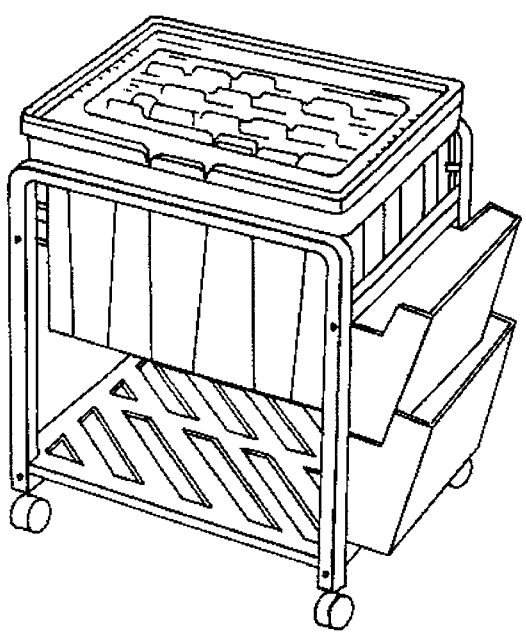
FIG. 4 shows a perspective view of a shuttle using a pair of file container assemblies.

FIG. 4 shows a perspective view of an exemplary file container assembly and shuttle combination wherein two file container assemblies 20 are shown mounted to the shuttle 50. Although not shown, one or two more file container assemblies 20 can be mounted to the shuttle 50 on the side opposite the already mounted assemblies.

It should be understood that although through holes are depicted for mounting the plates 3 to a surface, other mounting means may be utilized with the plates such as hooks or pins extending from the rear surface of the plates. In addition, although rectangular plates are shown, the plates 3 can be in any configuration, including a square or polygonal shape, providing that the posts and slots are located to achieve the single footprint design when surface mounting and lateral extension outwardly of the file container when mounting to a shuttle. That is, the posts 5 and slots 11 should be spaced apart a sufficient distance so that when the plates 3 are used with the slots extending outwardly, the slots extend beyond the sides of file container for shuttle attachment. Likewise, the posts 5 should be located to ensure that the edge opposite the slotted edge aligns with the file container side walls when surface mounting the brackets.

The plates and file container may be made of any materials having sufficient strength to either support the file container or support files therein. Preferred materials include plastics or polymers for their ease of manufacture and low costs.

The mounting bracket assembly can be mounted to any surface capable of being fastened to and supporting the weight of the brackets, the file container and any material therein. Preferably, the mounting bracket assembly is fixed to a vertical surface for file storage.

As such an invention has been disclosed in terms of preferred embodiments thereof and fulfill each and every one of the objects of the present invention as set forth herein above and provides a new and improved mounting bracket assembly and file container assembly for use with surfaces, preferably vertical surfaces, and shuttles or cards.

Of course, various changes, modifications and alterations in the teachings of the present invention may be contemplated by those skilled in the art without departing from the intended spirit and scope thereof. As such, it is intended that the present invention only be limited by the terms of the appended claims.

We claim:

1. A filing container assembly comprising a file container, a cart and a pair of brackets for supporting said file container on the cart, each bracket further comprising:

a) a plate;

b) means for mounting said plate to the cart;

c) a pair of posts mounted to one surface of said plate in a spaced apart relationship supporting said file container thereon;

d) a pair of slots located along one edge of said plate and in a spaced apart relationship; and wherein said cart having opposing supports with ribs, said cart further having U-shaped legs, said U-shaped legs including said ribs therein, and said ribs receiving a respective one of said slots for mounting said file container to said cart.

2. The file container assembly of claim 1 wherein each of said plates is rectangular in shape and said edge is one of the longer edges of said rectangular plate.

3. The file container assembly of claim 1 wherein said posts are longitudinally aligned along said plate.

4. The file container assembly of claim 1 wherein said posts are aligned parallel to and spaced from a longitudinal axis of said plate.

5. The file container assembly of claim 1 wherein each of said posts has two different diameter portions for engaging said file container.

6. The file container assembly of claim 1 wherein said means for mounting further comprises a pair of spaced apart openings through said plate, each of said spaced apart openings is sized to receive a fastener for fastener engagement to said surface.

7. The file container assembly of claim 1 wherein each of said slots extends inwardly and perpendicularly to said edge.

8. The file container assembly of claim 1 wherein said file container comprises a back plate having openings to receive and engage said posts, a front plate, a bottom and opposing sides, said front plate, back plate and opposing sides joined to form a recess for storing files.

9. The file container assembly of claim 8 wherein said posts are located in said plates such that when said posts engage said openings and said plates are mounted to said surface, each of said opposing sides aligns with an edge of each respective said plate opposite said one edge.

10. The file container assembly of claim 8 wherein said posts are located on said plates such that when said posts engage said openings and said plates are mounted to said cart, each said edge containing said slots extends laterally of a respective said opposing side.

11. The file container assembly of claim 8 wherein said back plate has recesses, each recess corresponding in size to a respective one of said plates.

12. The file container assembly of claim 11 wherein said recesses are arranged along lateral edges of said back plate.

* * * * *